United States Patent [19]

Ward

[11] Patent Number: 5,211,147
[45] Date of Patent: May 18, 1993

[54] REVERSE STRATIFIED, IGNITION CONTROLLED, EMISSIONS BEST TIMING LEAN BURN ENGINE

[76] Inventor: Michael A. V. Ward, 20 Marrett Rd., Lexington, Mass. 02173

[21] Appl. No.: 685,057

[22] Filed: Apr. 15, 1991

[51] Int. Cl.[5] .................. F02B 17/00; F02P 5/04; F02D 33/00
[52] U.S. Cl. .................. 123/418; 123/430; 123/478; 123/637; 123/661
[58] Field of Search .......... 123/295, 430, 478, 418, 123/661, 637, 598, 681, 682

[56] References Cited

U.S. PATENT DOCUMENTS

| | | | |
|---|---|---|---|
| 3,554,170 | 1/1971 | Schenk et al. | 123/445 |
| 4,043,309 | 8/1977 | Kato et al. | 123/287 X |
| 4,104,989 | 8/1978 | Resler, Jr. | 123/430 |
| 4,188,932 | 2/1980 | Konishi et al. | 123/287 X |
| 4,480,606 | 11/1984 | Kato et al. | 123/684 X |
| 4,499,872 | 2/1985 | Ward et al. | 123/344 |
| 4,561,403 | 12/1985 | Oyama et al. | 123/682 X |
| 4,608,956 | 9/1986 | Katoh et al. | 123/417 |
| 4,658,792 | 4/1987 | Yamashita et al. | 123/430 X |
| 4,677,960 | 7/1987 | Ward | 123/598 |
| 4,823,753 | 4/1989 | Murakami et al. | 123/417 |
| 4,908,765 | 3/1990 | Murakami et al. | 123/492 X |
| 5,016,595 | 5/1991 | Kawai et al. | 123/478 |

Primary Examiner—Tony M. Argenbright
Attorney, Agent, or Firm—Jerry Cohen

[57] ABSTRACT

An internal combustion engine system with combustion chamber (11) of the upper-half-clam-shell type in which is generated both swirl and squish and microscale turbulence near the center of the chamber where is located a toroidal gap spark plug (18) fired according to a lean-burn-timing prescription to deliver rapidly moving spark pulses (24) of high power and energy into a very lean reverse stratified mixture further diluted with exhaust gas residual for further reducing NOx emissions while maintaining low HC emissions and high engine efficiency.

30 Claims, 8 Drawing Sheets

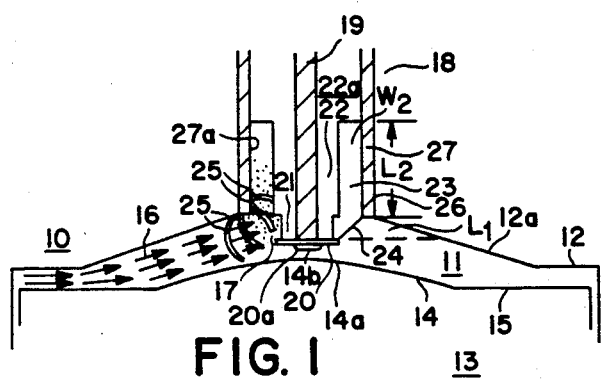
FIG. 1
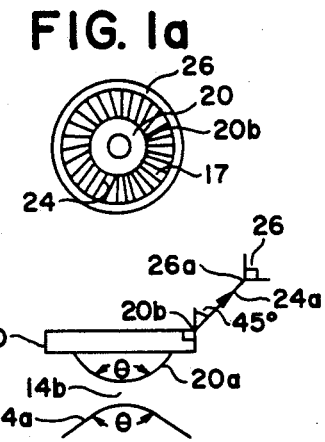
FIG. 1a
FIG. 1b
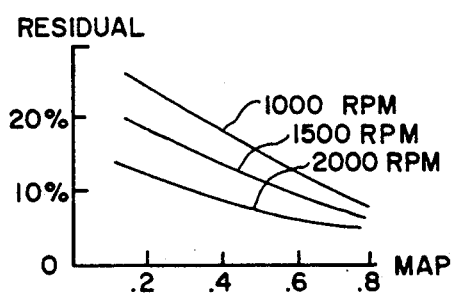
FIG. 2a
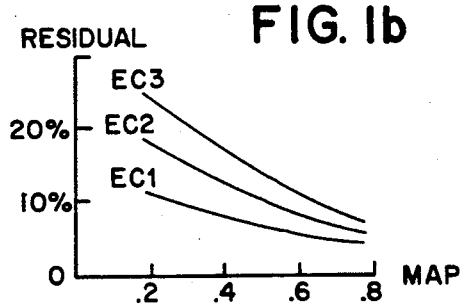
FIG. 2b
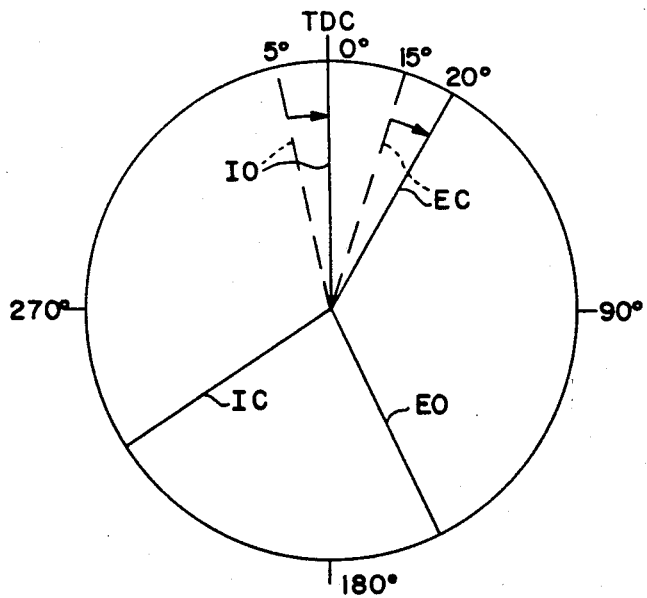
FIG. 3
FIG. 3a

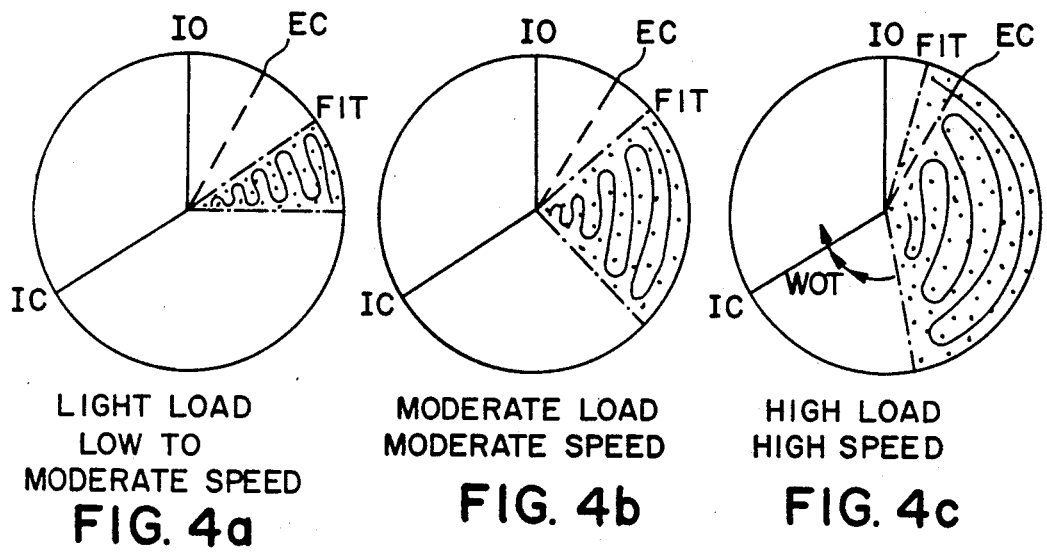
LIGHT LOAD
LOW TO
MODERATE SPEED
FIG. 4a
MODERATE LOAD
MODERATE SPEED
FIG. 4b
HIGH LOAD
HIGH SPEED
FIG. 4c
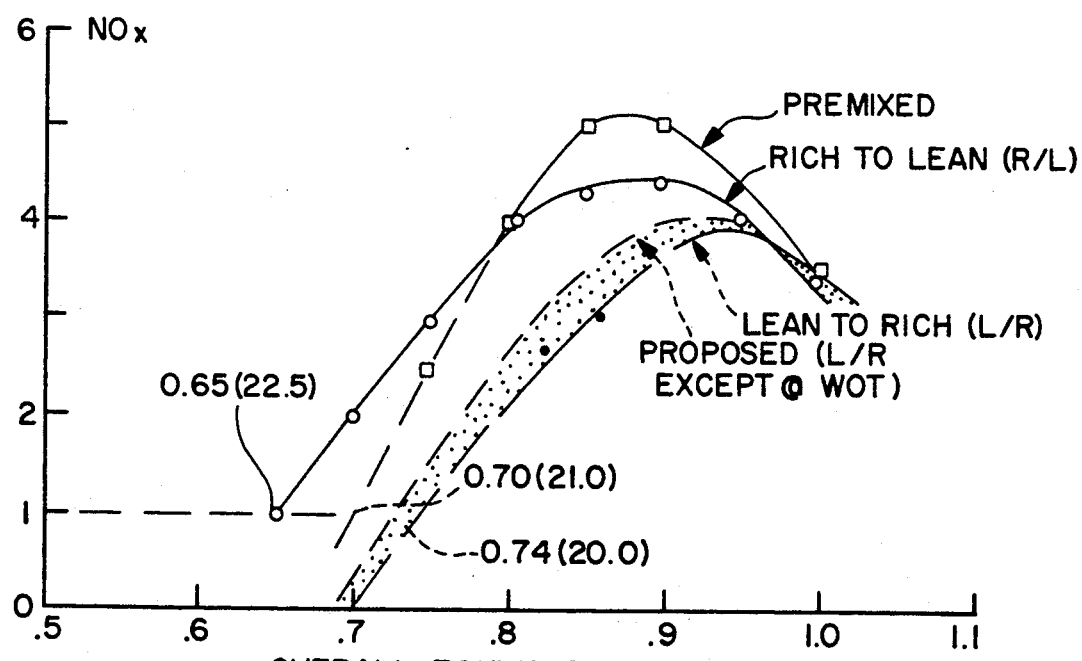
FIG. 5

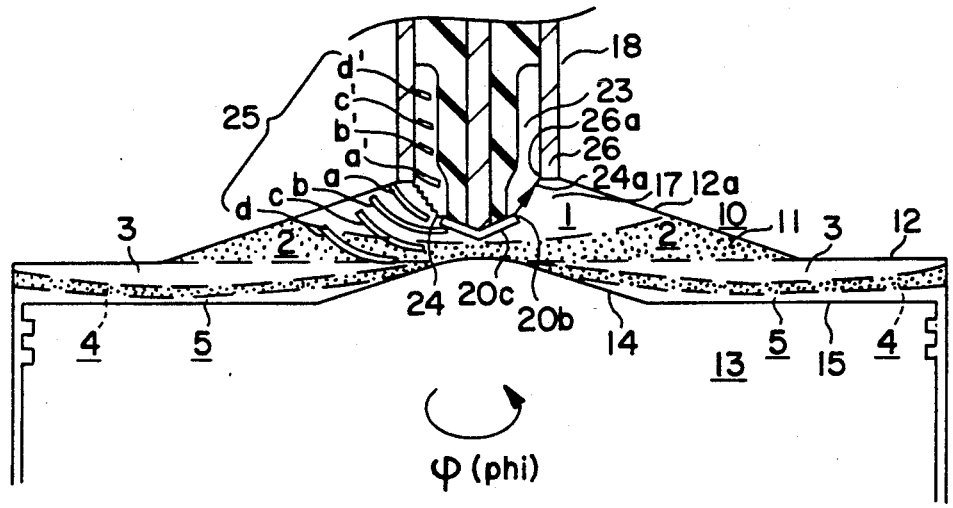
FIG. 8
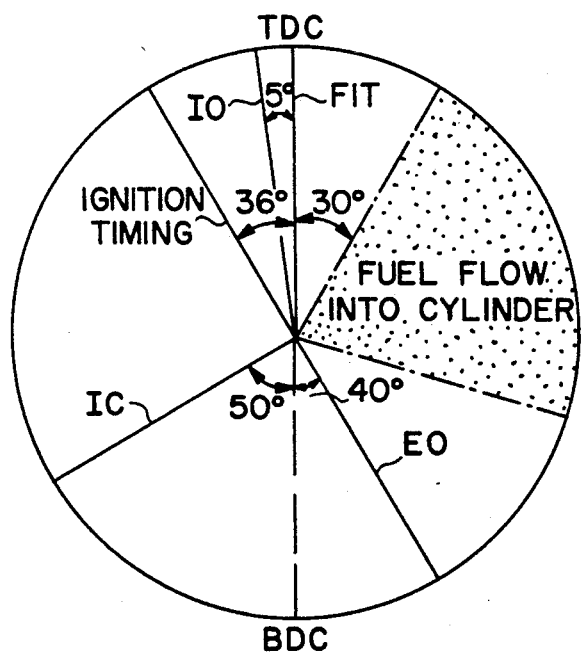
FIG. 8b
| | $V_i$ | $AFR_i$ | $FUEL_i$ |
|---|---|---|---|
| 1 | 25% | 23:1 | 20% |
| 2 | 25% | 22:1 | 25% |
| 3 | 30% | 20:1 | 35% |
| 4 | 10% | 21:1 | 10% |
| 5 | 10% | 22:1 | 10% |
FIG. 8a
| IGNITION TIMING | 36° BTDC |
|---|---|
| FUEL INJECTION TIMING | 0° ATDC |
| FUEL ENTRY TIMING | ~30° ATDC |
FIG. 8c

REVERSE STRATIFIED, IGNITION CONTROLLED, EMISSIONS BEST TIMING LEAN BURN ENGINE

BACKGROUND OF THE INVENTION AND PRIOR ART

The present invention relates to internal combustion engines and more particularly to spark ignited, reciprocating-piston type engines (although other forms of such engines, e.g. rotary engines, are within the broadest scope of the invention as to one or more of its features). The present invention deals with effective utilization of variable air-fuel ratio lean burn modes of operation of internal combustion (IC) engines with preferably electronically controlled fuel injection and ignition timing for improved emissions control, especially control of the more difficult to reduce nitrogen oxide (NOx) emissions, and for improved fuel efficiency. In more optimal form, the invention features the purposeful use of residual gases in the engine in a way that does not reduce low-end torque, and further features, contrary to industry practice, the purposeful use of reverse stratification for lowest NOx emissions. Such approach is made possible by the incorporation of very high power and high energy (VHE) ignition as part of the overall engine design.

The features of the VHE ignition per se, have been disclosed in several prior patents, including U.S. Pat. No. 4,677,960 on voltage doubling, U.S. Pat. No. 4,774,914 on piston firing, U.S. Pat. No. 4,841,925 on enhanced toroidal gap ignition with focussing spark plug tip, on U.S. patent application Ser. No. 07-350,945, now abandoned, and in co-pending U.S. patent application Ser. No. 684,595, now U.S. Pat. No. 5,131,376, entitled "Distributorless Capacitive Discharge Ignition System". These patents and two patent applications are incorporated herein by reference as though set out at length herein.

The present invention can be utilized with a variety of fuels including conventional petroleum-derived hydrocarbon mixture fuels, e.g., gasoline, or non-conventional petroleum and/or plant derived fuels, e.g., methanol, ethanol, natural gas, alcohol-hydrocarbon mixtures, etc. Discussion hereinafter is limited to the conventional fuels. But it will be understood that the points discussed applicable with correction factors well known to those skilled in the art to other fuels.

Some terms used herein are now defined:

(1) Air-Fuel Ratio (AFR):

The weight ratio of air to fuel (usually lbs to lbs or kilograms to kilograms) as the vapor form equivalent of given weights of air and fuel at standard temperature and pressure (STP), all in accordance with standard industry practice which takes AFR of 14.7 to 1 (14.7:1) as a stoichiometric ratio (14.7 lbs of air combusting 1 lb of gasoline, defined also as (AFR)stoich. An alternate expression of AFR is lambda ($\lambda$), wherein lambda equals AFR/(AFR)stoich. and hence lambda is 1.0 at stoichiometric mix and STP conditions. The term equivalence ratio phi ($\Omega$), the inverse of lambda, may also be used. AFR varies in accord with certain engine settings, principally engine speed and manifold absolute pressure (MAP). A carburetted nominally stoichiometric engine typically inducts an AFT of 13:1 at full throttle and ideally 14.7 at part throttle.

(2) Lean-Burn (or Lean of Stoichiometric, or highly dilute):

Operation of an internal combustion engine at AFR above stoichiometric, i.e. in the 16:1 to 18:1 range for current lean burn gasoline engines, but preferably 18:1 to 25:1, a high degree of lean burn, as is contemplated in the present invention, all subject to appropriate adjustment of the range limits for other conditions as indicated above. In terms of lambda, excess air above stoichiometric at AFR of 24:1 is approximately lambda=1.6.

(3) Three way catalyst and Lambda closed loop control:

A multi-mode (three-way catalyst) oxidation-reduction exhaust clean up system which is used in a major portion of the world's automotive engines. A closed loop feedback maintaining lambda close to one is employed in state of the art systems.

(4) Ignition Timing:

The degrees before top dead center (BTDC) of piston stroke (or rotary engine equivalent) where ignition commences. Emissions and specific fuel efficiency as a function of advanced or retarded timing have been substantially studied in the art.

(5) Valve Timing:

The degrees, before and after top dead center (BTDC and ATDC) where the intake valve opens and the exhaust valve closes, and the degrees before and after bottom dead center (BBDC and ABDC) where the exhaust valve opens and the intake valve closes.

(6) EGR-Exhaust Gas Recirculation:

The amount of exhaust or burnt gas (as a percentage) that is recirculated from the exhaust into the unburnt gas, i.e. the fuel-air mixture or charge, which is inducted into the engine cylinders.

(7) Residual Gas or Residual Gas Fraction or Residual:

The amount (fraction) of exhaust gas remaining in the inducted fuel-air mixture after the exhaust valve closes to participate in the combustion of the inducted mixture.

(8) Stratified Charge:

Generally defined to mean the purposeful formation of a non-uniform fuel-air mixture or charge in the engine cylinder prior to combustion, where a locally richer mixture is produced at the spark plug site so as to help ignition of an overall (combustion chamber as a whole) leaner mixture.

(9) Reverse Stratification:

The process (described in this application) whereby a leaner than average combustion chamber fuel-air mixture is formed locally at the spark plug site [or, where the spark plug is located in a region of a premixed fuel-air mixture where the almost homogeneous local mixture is leaner than the average]. A difference of at least one air-fuel ratio is required for the mixture to be considered reverse stratified in the context of the present invention, where the stratification is designated by the two AFR numbers written with a slash between them, the first number being higher for reverse stratification, e.g. 22/20.

(10) Turbulence:

The vigorous agitation of the fuel-air mixture in a combustion chamber, e.g. an engine cylinder characterized by bulk motions (kinetic energy) of the mixture including large scale organized motions such as swirl and squish and small scale disorganized (more random) motions such as microscale turbulence.

(11) Wide Open Throttle or WOT:

The operating condition of an engine in which the throttle or other means controlling air-flow into the cylinder is completely open to permit the maximum amount of air to enter the cylinder.

(12) MAP:

manifold absolute pressure.

(13) MBT:

minimum best timing, the industry-recognized expression for the ignition timing (spark occurence as degrees in advance of top dead center, or "spark advance") that yields best torque (maximum brake torque) for the engine.

Other related terms are defined below as used.

Primary interest in lean burn has come from developers and users of automobile related internal combustion engine technology. These investigators have failed to define ways of realizing the potential benefits of lean burn operation under the full range of conditions of automobile usage, especially with the advent of VHE ignition, to be described presently.

The art of understanding of difficulties with a moderate degree of lean burn (lambda of about 1.1) are expressed in many references, e.g., at page 325 of the 1988 Edition of the Bosch Automotive Electric/Electronic/Systems Manual. See also, pp. 290-291, 415, 417 (motronic map) and 439 of the 1986 Bosch Automotive Manual (2nd Edition) and pp. 81-96 and 348-360 of Arcoumanis, "Internal Combustion Engines" (Academic Press 1988).

It is therefore a principal object of the present invention to provide a range of internal combustion engine apparatus and a range of methods of internal combustion engine operations that realizes, effectively the potential of lean burn, especially in reducing the NOx emissions to the required low levels.

SUMMARY OF THE INVENTION

The invention comprises a high degree of lean burn operation e.g., 18:1 to 25:1 AFR, with preferably somewhat increased levels of burnt gas residual at low to moderate loads, and where practical, some degree of reverse stratification, with allowance of load and speed dependent variable AFR operation and adjustment of ignition timing in relation to AFR to minimize NOx emissions and maintain high engine efficiency. Such variable AFR lean burn operation preferably uses improved engine design disclosed herein and very high power and high energy (VHE) ignition which is incorporated, i.e. integrated, into the engine. Where applicable and possible, such engine design and ignition is used to advantage to employ (and tolerate) the preferred higher residual (without loss of low-end torque) and the preferred reverse stratification, all of which work to lower NOx emissions, the exhaust emission most difficult to bring to the required very low levels with lean burn.

These forms of control can be applied to maintain low NOx exhaust emissions while providing efficiency improvements through lean burn and controlling carbon monoxide (CO) and hydrocarbon (HC) exhaust emissions to low levels, and accommodating the full speed-torque range of a given engine design.

The preferred level of higher than normal residual exhaust is achieved through somewhat higher than normal valve overlap (defined as the crank angle degrees over which both the intake and exhaust valves are open) and through a somewhat more retarded than normal closure of the exhaust valve. Preferably, variable valve timing is employed which provides moderate levels of residual, i.e. 10% to 20%, at light to moderate loads for low NOx, and low residual, i.e. 5% or less, at higher loads, especially at low speeds so as to provide good low-end torque so that lean AFR can be maintained at moderate vehicle acceleration. In the case of higher vehicle acceleration where sufficient power cannot be provided under lean burn operation, preferably a strategy is employed wherein air-fuel ratio changes discontinuously, i.e. very rapidly from lean to stoichiometry near maximum intake manifold pressure. Ignition timing also changes discontinuously to correspond to the rapid change in AFR.

The preferred accommodation of reverse stratification is achieved through several techniques, most notably through use of engine swirl with controlled fuel injection timing in combination with ignition enhancers, principally use of VHE ignition with a large ignition volume in which is preferably formed microscale turbulence of the mixture. A design is disclosed of ignition integrated with the engine for creating such microscale turbulence at the spark plug site, designated as "upper-half clam shell combustion chamber", in which the spark plug is preferably located at a lean air-fuel ratio region (for reverse stratification) so that the combination of VHE ignition and turbulence provides better combustion, i.e. lower cycle-to-cycle variation, of the very lean local air-fuel ratio.

The timing control is targeted to an (NOx) emissions best timing, and involves an advance/retard timing schedule which differs from the conventional schedules employed to optimize efficiency and emissions in the prior art. The ignition timing strategy includes retarded timing relative to MBT for NOx control, [i.e., ignition firing at less advance from top dead center than minimum best timing, or MBT], designated as emissions best timing ("EBT"). But more important, it includes a specific timing strategy designated as "lean burn timing", or LBT as it will be referred to henceforth. This timing strategy is based, in part, on the recognition that, in general, ignition timing (advance) for air-fuel ratios above 16:1 to 18:1 is proportional to air-fuel ratio. By employing a strategy wherein air-fuel ratio, above approximately 18:1, is increased in proportion to engine speed from approximately 1200 RPM to approximately 3000 RPM, a simple and novel lean burn timing (LBT) relationship is established wherein ignition timing changes linearly with speed from approximately 1200 RPM to approximately 3000 RPM, and is approximately constant for engine speeds below 1200 RPM and above 3000 RPM. At higher MAP value, e.g. 0.75, both AFR and timing drop with MAP value over the 1200 RPM to 3000 RPM range.

The control strategy thus indicated is explained in further detail and other objects, features, and advantages of the invention will be apparent from the following detailed description of preferred embodiments taken in conjunction with the accompanying drawings.

BRIEF DESCRIPTION OF THE DRAWINGS

FIG. 1 is a fragmentary partially sectioned drawing of a preferred embodiment of an engine cylinder with integrated spark plug of a VHE ignition suitable for providing the necessary lean burn capability to achieve the results of the invention.

FIGS. 1a and 1b are an end view and side view, respectively, of the tip of the spark plug (and piston tip) for providing the necessary VHE ignition.

FIGS. 2a and 2b are graphs of percent residual versus MAP.

FIGS. 3 and 3a are schematics showing typical and desired engine valve timings for increasing residual in engines made according to the present invention.

FIGS. 4a, 4b, 4c are schematics showing preferred fuel injection timing for reverse stratification at three speed/load settings for a sequential injection system in an engine with swirl.

FIG. 5 is a graph of NOx emissions versus AFR for an engine with three types of charge mixture: premixed, normal stratified (rich to lean), stratified lean to rich, and the proposed reverse stratified (lean to rich except at WOT).

FIG. 8 is an expanded partially sectioned view, essentially 1 ½ to 2 times scale, of the engine cylinder of FIG. 1 showing the in-cylinder mixture stratification during the early stages of combustion for the preferred reverse stratified charge lean mixture.

FIGS. 8a, 8b, 8c are a schematic and tables of timing and mixture composition parameters for a possible operation of the engine cylinder leading to the reverse stratification depicted in FIG. 8.

Similarly, FIGS. 14 and 14a are side view schematics emphasizing the nature of a "lower-half clam shell" combustion chamber which is an approximate mirror image of the chamber design of FIGS. 13/13a.

DESCRIPTION OF PREFERRED EMBODIMENTS

Figure 6:
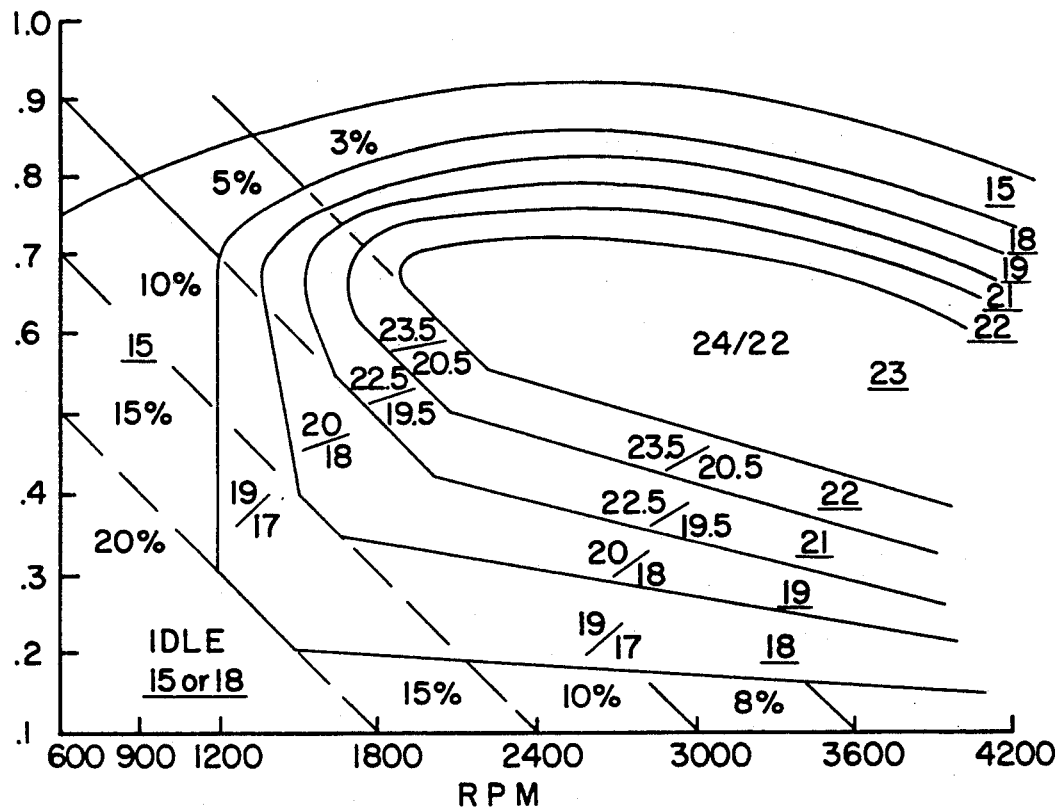
FIG. 6 is a speed-density map showing proposed contours of AFR and proposed stratification (where practical) and proposed contours of residual.

FIG. 1 is a side view of a preferred embodiment of an engine cylinder with cylinder head 10 with surfaces 12 and 12a defining upper boundary of combustion chamber 11, piston 13 with surfaces 14 and 15 defining the lower boundary of the combustion chamber 11, and an integrated spark plug 18 designed to provide the very high power and high energy (VHE) ignition and combustion capability for meeting the objectives of this invention. The spark plug 18 is disclosed in the patents cited above and has a toroidal gap 17 which creates a spark 24 between the spark plug central conductor high voltage cylindrical disk electrode 20/20a and the inner edge 26 of the spark plug shell 27. The spark plug 18 has a center conductor 19 and the insulating sections 21, 22, and 22a. A feature of this integrated spark plug is a larger than normal cavity 23 contained between the outer surface of insulator 22 and the inner surface 27a of spark plug shell 27 which acts as part of the combustion chamber. The cavity length L2 is preferably ¼" to 1" long and the width W2 is between 0.04" and 0.2" depending on factors including plug size, i.e. 18 mm versus 14 mm plug, etc. Preferably, inner surface 27a of shell 27 bounding cavity 23 is coated with catalytic material which promotes combustion, e.g. palladium, platinum, etc.

The combustion chamber 11 creates squish and piston induced air flow motion (momentum vectors 16) which dissipate their energy near the toroidal spark gap region 17 to create microscale turbulence which is especially useful when used in conjunction with VHE ignition. An unusual feature of this combustion chamber 11, called upper-half-clam-shell, is a geometry which produces radially inward but upward (versus conventional downward) motion of the air upon compression by the piston 13. This design helps remove fuel that may collect on the piston surface and assist in its evaporation. It also helps direct such collected fuel (mixture) toward the spark gap 17. Preferably swirl is produced in the combustion chamber (by any of a number of ways known to those versed in that art, i.e. valve shrouding, valve masking, use of swirl valve, etc.). The combination of piston compression, swirl, and squish (near TDC) will help produce small scale turbulence, i.e. microturbulence, through destruction of organized air-flow motion in the vicinity of the spark gap 17.

In this design, the VHE ignition is preferably of the class disclosed in the various patents cited earlier, which features rapidly firing multiple sparks created by voltage doubling coils with peak spark currents in the amps range and time between sparks and construction of the spark plug tip so as to produce motion of the spark pulses around the toroidal gap 17 and/or in an outward motion as a result of small flow velocities that exist in the spark gap 17. This produces flame front kernels 25 which move into the cavity 23, outward into the main combustion chamber 11, and around the periphery of the spark plug end (defining a toroidal gap) to thus ignite a very large volume of the lean mixture Preferably the spark gap is about 0.1 inches wide for a normally aspirated IC engine ("about" being defined to be within minus 50% of the number quoted and twice the number, or 0.05" and 0.2" in this case). Spark plug tip 20a and piston tip may be contoured and located to allow for a tip/piston firing gap 14b (e.g. 0.05") smaller than the fixed toroidal gap when the piston is firing near TDC (where the pressures are highest), as disclosed in the previous patents and application cited above.

FIG. 1a is an end view of the preferred spark plug with toroidal gap 17. defined by the outer edge 20b of high voltage electrode 20 and the inner edge 26 of spark plug shell 27. In this figure are shown spark pulses 24 encircling the entire toroidal gap 17 to produce the largest possible circular ignition/flame kernel. The ability to produce this circular fan-like spark kernel is disclosed in U.S. Pat. application Ser. No. 7-350945. Greatest lean burn ignition capability is achieved by igniting larger portions of the mixture in toroidal gap 17. The duration of the spark pulses is preferably approximately 36 degrees crank angle, or 20% of the time between spark firings for a four cylinder engine.

FIG. 1b is a side view of a preferred spark plug tip 20/20a showing a rectangular central electrode 20 dimensioned and oriented to produce a spark with the inner edge of 26a of spark plug shell end 26 such that the high voltage electric field 24a that produces the spark is preferably directed from the center of the corners 20b and 26a of the inner and outer electrodes to reduce the spark formation break-down voltage. Spark plug tip 20a is shown positioned across piston tip 14a defining variable gap 14b, with the contours at the tip defining included angles theta which are preferably approximately 120 degrees.

"Approximately" is generally defined to be within 25% plus and minus of the value quoted.

FIG. 2a is a graph showing percent residual in an engine cylinder as a function of manifold absolute pressure for three engine speeds: 1000 RPM, 1500 RPM, and 2000 RPM. These curves are for a certain, somewhat higher, level of valve overlap in an engine. FIG. 2b shows three curves for a single engine speed, e.g. 2000 RPM, for three cases of exhaust valve closure EC1, EC2, EC3, representing progressively later exhaust valve closure, which progressively increases the level of residual. Later exhaust valve closure is desired for producing a nominal 10% residual at moderate speeds and loads for NOx reduction under lean conditions. At higher MAP, low residual, e.g. 5% or less, is preferred for high low-end torque.

For the purposes of this invention preferably one selects a slightly higher degree of valve overlap than normal and a somewhat retarding of the closure of exhaust valve to increase the level of residual. Preferably, variable valve timing is employed to produce the nominal 10% residual at low to moderate MAP and low residual at high MAP. FIG. 3 depicts approximately standard and proposed exhaust closing (EC) at light loads of, for example, a Ford Escort engine, achieved by rotating the cam with respect to the crank. FIG. 3a shows, in tabular form, proposed valve timings with a 5 degree increase in valve overlap for somewhat higher residual. Note that the exhaust valve opening (EO) is also retarded 5 degrees which will provide slightly higher engine efficiency and lower exhaust temperatures through extending the expansion stroke. The intake valve closure (IC) is preferably advanced to increase low-end torque.

The proposed method of increasing the residual shown in FIGS. 3 and 3a are to be taken as one possible method, it being understood that other methods can be employed, the main point being that increasing residual is useful in reducing NOx under conditions of lean burn. Two stroke engines have naturally high residual which can be advantageously used for minimizing NOx emissions. They also have naturally high low-end torque which is important in maintaining lean operation at low speed WOT operation.

In applications where charge stratification can be produced in the engine cylinder, e.g. high swirl with sequential injection, it is desirable to create, not the normal, positive, rich-to-lean stratification, but reverse stratification under lean AFR conditions. Normal stratification is defined to be rich to lean with respect to the layering of the charge as measured from the spark plug site, and is the method used in all known lean burn engines, from the Honda CVCC to the Toyota Lean Burn engine (see SAE paper 851210, 1985). This is done to extend the lean misfire limit (without having to use VHE ignition), and actually aggravates NOx emissions for the same air-fuel ratio.

The effect of lean-to-rich stratification on NOx emissions reduction is pointed out in papers on normal stratification by Paul N. Blumberg, Combustion Science & Technology, Vol. 8, 1973, and in two papers by Arthur Quader et al, SAE papers 780234 (1978) and 820131 (1982). While these authors made note of the effect of lean-to-rich stratification, no attempts were made to use the effect to advantage. In fact, the effect was considered a nuisance. The fuel injection timing required to produce the effect was dubbed "Worse Injection Timing", or WIT, versus "Best Injection Timing", or BIT, for rich-to-lean or positive stratification, and great pains were taken to produce BIT. Furthermore, even in the theoretical curves presented by Blumberg, the leanest AFR for which lean-to-rich stratification is shown is 16.6 AFR, not considered lean for the purposes of this invention. In the papers of Quader et al lean-to-rich stratification was shown for AFRs up to and no leaner than 18:1 (equivalence ratio of 0.80), the lower limit of what is considered lean for the purposes of the present invention. Great efforts were made by automobile companies, e.g. Honda CVCC, Toyota Motors, and others, to use normal stratification for enhancing lean burn without pointing out that the level of NOx emissions was actually being aggravated. In SAE paper 851674 Arthur Quader et al actually produce an engine map of optimal injection timing (BIT) for producing normal (positive) stratification. The map is highly complex with no systematic method for achieving BIT. In the case of the present invention, where a principal objective is to produce reverse stratification (WIT) relatively simple systematic means are available for achieving this.

It is thus a principal object of the present invention to produce reverse stratification which can be achieved relatively easily, as indicated in FIGS. 4a through 4c. In using the VHE ignition disclosed earlier, one simply uses the end of the gate which defines the duration of the ignition pulses to trigger the fuel injectors. For a four cylinder engine (assumed for ease of discussion) the typical gate pulsing width is approximately 20%, representing the percent duration of the ignition pulses relative to the total time between ignition firings as already discussed. Using the end of the gate to fire the injectors, the injection timings designated as FIT in FIGS. 4a to 4c can be attained to produce the desired reverse stratification. For the typical ignition firing order cylinder 1,3,4,2 the correct fuel injection timing is 4,2,1,3 respectively. A cam reference timing is required and easily produced to, for example, fire injector 4 at cam reference ignition firing cylinder 1, and to then use a counter to signal the firing of the remaining three injectors at the next three ignition firings in the order 2,1,3.

In FIG. 4a is shown the fuel injection timing FIT and injection duration (shaded portion) produced by triggering at the end of the gate signal under light load and low to moderate speed conditions. Likewise FIGS. 4b and 4c show the respective fuel injection timings FIT and injection duration for higher speeds and loads. It is noted that injection starts after the intake valve opening, which is not essential for simple reverse stratification but is preferred for the reverse stratification as is disclosed herein, since it is useful: 1) in preventing any fuel (mixture) from passing through the exhaust valve (especially for the preferred later exhaust valve closure); 2) for promoting mixing and evaporation of the fuel by having it injected into the moving air-stream; and 3) insuring that the air first entering the cylinder is very lean (free of fuel in most but not all operating conditions) to thus minimize the fuel collected on the piston surface and trapped in the piston-ring crevice which is responsible for most of the HC emissions. Simple reverse stratification is achieved by having the injection end well before the intake valve closes, especially when one retards the exhaust valve closure for higher residual as disclosed in FIGS. 2b, 3, 3a, so that the last part of the air entering the cylinder has little entrained fuel (recognizing that upon compression this layer will enrichen but still be leaner than the average).

Thus, when the reverse stratified mixture is compressed and brought to the ignition timing point it will be relatively leaner than the average mixture but not so lean as to not ignite with VHE ignition. At WOT, stoichiometric high speed (high power) operation fuel will be injected near or beyond intake valve closure, producing homogeneous or slightly positive stratification which is acceptable at near-stoichiometric AFR high power operation.

FIG. 5 shows expected NOx levels as a function of equivalence ratio for pre-mixed, i.e. homogeneous charge, conventional (rich to lean) charge stratification, and a lean to rich stratification, and the proposed range for the present invention. For an average equivalence ratio of 0.7, i.e. air fuel ratio of approximately 21:1, one can achieve a three fold reduction of NOx emissions by utilizing the proposed reverse stratification versus the conventional stratification. These lean-to-rich curves are extrapolations since data does not exist to our knowledge for reverse stratification below an equivalence ratio of 0.8, the region of interest.

FIG. 6 is a proposed air-fuel ratio map based on what is known as a speed-density map wherein contours of constant air-fuel ratios are shown, i.e. the numbers in the circles, and contours of percent residual are superimposed. In this map are also shown proposed levels of stratification assuming a design which permits stratification, e.g. high swirl with sequential injection. The following are some significant features of this map.

1. Air-fuel ratio at idle is either just lean of stoichiometric, i.e. 15:1, or substantially leaner, i.e. 18:1, depending on engine temperature and lean burn capability of the engine. This air-fuel ratio is also maintained at lower speeds, e.g. below 1200 RPM. At higher load or MAP values, AFR is shown to take on the value of 15:1, to provide good low-end torque. The percent residual drops with increased MAP at the low speeds to further maintain low-end torque.

2. With increasing load (MAP) and speed the average air fuel ratio increases from 18:1 to 23:1, corresponding in this preferred case to a reasonably well designed lean burn engine. The leanest air fuel ratio ranges from approximately 0.4 to 0.7 MAP, and then begins to enrichen once again but more rapidly at high MAP values than it rose for low MAP values to maintain (low NOx) lean combustion as close to wide-open-throttle (WOT) as practical.

3. For high speed and load conditions near WOT the percent residual drops with speed and load which is desired for the higher power requirements at WOT.

4. At WOT, use of an air fuel ratio of approximately 15:1 is shown, preferably closed-loop stoichiometry, and a somewhat retarded ignition timing for lowest emissions and good power. By using VHE ignition, as has been demonstrated, the shortfall in power at WOT and 15:1 AFR is only one or two percent below that of conventional or high energy ignition used by the industry at WOT and an AFR of 13.5:1 and MBT (which also produces very high level of HC and CO emissions). MBT is minimum best timing (for maximum torque) in degrees BTDC.

5. For a given lean AFR island, the degree of reverse stratification (if available) can be made higher at high loads, but realistically becomes close to zero or even slightly positive at WOT if 15:1 AFR is used (for best power).

6. At cranking conditions, near zero or slightly positive stratification is desired for easy starting, achieved by delayed fuel injection timing, e.g. at approximately 90 degrees ATDC, provided by an approximately 50% ignition gate, versus 20 degrees ATDC provided by a 20% gate, assuming fuel injection at the end of the gate (of the appropriate cylinder as described). The longer ignition gate is also helpful in igniting the mixture under starting conditions.

In a typical highway cruising operating condition of 55 MPH with a MAP value of say 0.5 and RPM of 2,000, one operates at an air-fuel ratio of 21:1 assuming reverse stratification, and somewhat leaner (e.g. 22.5:1) for homogeneous charge. Percent residual is preferably about 10%. For reverse stratification the AFR at the spark plug site is approximately 22:1, and is 20:1 near the piston top. For these conditions, NOx can be as low as 50 to 100 PPM.

Figure 7:
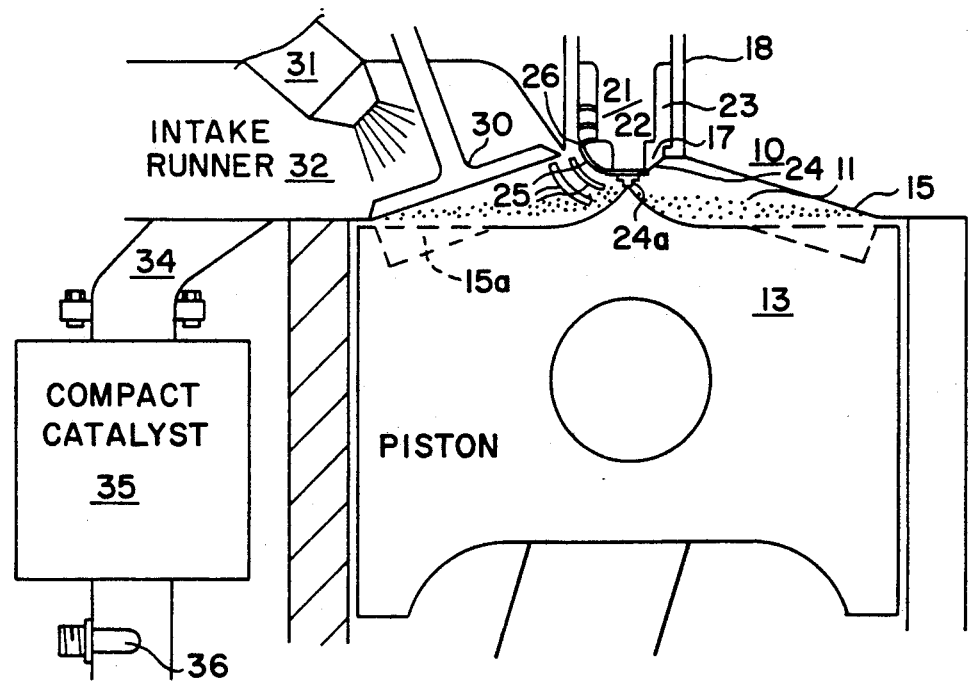
FIG. 7 is a more complete partial section view of an engine cylinder similar to that of FIG. 1 including port fuel injection and compact catalyst near the exhaust manifold for faster catalyst light-off for oxidation of hydrocarbons (and to a lesser extent CO which is already very low under lean conditions).

FIG. 7 is a more complete partial view of a slight variant of the engine cylinder of FIG. 1 with like numerals representing like parts with respect to FIG. 1. In this design, the piston is cut out (section 15a) to accommodate the valve as is desired by production designers, with the piston still able to provide some squish. In this design port fuel injection is used with injector 31 close to intake valve 30 in intake runner 32 to give more precise injection timing (with respect to valve timing). Mounted to the exhaust manifold 34 is a compact catalyst (also called pre-catalyst) which is practical because of the lower exhaust temperatures of the average leaner burning mixture and (preferred) later exhaust opening. An oxygen (lambda) sensor is shown just below the catalyst (but still close to the exhaust manifold) where it can read the more realistic post-catalyst oxygen content. The catalyst 35 is generally an oxidation (rhodium free) catalyst, except where the extra cost of the rhodium is justified by the somewhat lower NOx achieved with the addition of rhodium.

In this figure is shown the preferred spark plug 18 with toroidal gap 17 and multiple sparks. Reverse stratification is assumed, with the richer mixture at the bottom shown darker than the leaner top layers. A thin lean layer is preferred adjacent to the piston achievable by fuel injection after the intake valve opening, as described.

In the figure one sees the flame fronts 25 move first in regions of leaner mixture into cavity 23 and the upper half portion of upper-half-clam-shell type combustion chamber 11. Preferably, but not required, the engine cylinder should be four valve which is compatible with the principles of the invention, especially in improving torque under lean operation.

If reverse stratification is not available, or regions in the combustion chamber which are leaner than average and accessible to the spark plug gap, a homogeneous, preferably vaporized, mixture is desirable for low NOx (at lean air-fuel ratios). However, even with a vaporizer type mixing device, accurate AFR control is required. One can use one or more fuel injectors with a vaporizer to provide supplementary fuel for acceleration, WOT, etc., and for producing reverse stratification by providing an average vaporized mixture strength at the lean value of the lean-to-rich (reverse stratified) required range and using timed injection of the fuel to locate the additional fuel away from the plug (and thus create reverse stratification with a well defined lean AFR background).

In the case of retrofit applications the use of VHE ignition with a plug 18 with large cavity 23 may in and of itself produce some level of reverse stratification, especially if the plug is recessed so that the mixture is not cleaned out as well as the rest of the combustion chamber during the exhaust stroke and is not filled as well on the intake stroke. This may partly make up for the lack of ability to operate on as lean mixtures as desired in older engines and thus improve NOx emissions also in retrofit applications (in addition to making large reductions in CO and in HC, and in improving engine efficiency with minimal impact on NOx).

With regard to engine starting, it may be particularly advantageous to use piston firing near TDC as shown (spark 24a) to ignite (forwards to the piston) the richer mixture that may collect there while also providing normal firing to shell edge 26 through long duration multi sparking of VHE ignition to greatly increase the probability of successful ignition during starting.

It is recognized that either the single control strategy already disclosed can be used for defining injection timing (by the end of the ignition pulse train or gate), or separate strategies can be used in which ignition and injection timing are optimized separately. In the former strategy, the ignition duration is taken to be less critical and is defined by considering the injection timing (as long as a minimum gate duration is used). The longer than otherwise required gate duration, i.e. 25% to 40% for a four cylinder engine, can be accommodated by using a greater modulation of the time between pulse firings. For example, one can have a pulse train with initially 200 microseconds (usec) between pulses, increasing to 300 usec after 3 milliseconds (msec), to 400 usec after 6 msec, to 500 usec after 10 msec and thereafter.

In such an approach the ignition gate could produce a very long spark duration, as long as 20 to 50 msec at low speeds to accommodate the preferred later fuel injection during cranking (for positive stratification). However, such a long spark duration would also be important in solving the so called "cold start problem", especially that of difficult to ignite fuels such as alcohol and natural gas. Energy as high as 500 millijoules (mj), or even 1000 mj if required, could be delivered to the mixture during starting over a large crank angle, e.g. over 90 degrees of crank angle. This capability also makes the direct fuel injection "starterless" engine, now under consideration, a real possibility.

It should be recognized that in the case of direct fuel injection applications, the VHE ignition should preferably be placed at the outer, leaner edge of the fuel spray consistent with reverse stratification, or in the middle of a conical spray with a lean center.

With regard to features of this invention, it is understood that other high energy ignition sources, e.g. plasma jet, microwave ignition, etc., can be used. Moreover, other combustion chamber shapes, e.g. Ricardo Nebula combustion chamber, can be used to create generally radially inward flows and microscale turbulence at the preferred central ignition site to enhance combustion of an otherwise leaner, preferably reverse stratified mixture. Furthermore, one can in principle use single central fuel injection (CFI) means to produce the preferred reverse stratification although the intake runner volume (between fuel injector and intake valve) may make this approach more difficult. Clearly, if the runner volume is much less than, i.e. less than half, the volume of the engine cylinder than such an approach becomes more practical.

Another means to achieve some of the features of this invention is to use variable valve timing. This is especially interesting in engines with dual camshafts where intake and exhaust events can be independently controlled.

With regard to "lean AFR mixtures" it should be appreciated that a principal result of the invention, the reduction of NOx emissions, can also be achieved by diluting the air-fuel mixture with burnt gas (residual) or by the use of EGR in conjunction with closed-loop stoichiometric operation. However, in such an approach one does not attain the efficiency improvement as with lean burn (diluting with fresh charge) or the very low CO exhaust emission levels. Also, at stoichiometric AFR and high EGR one gains as much if not more in terms of NOx reduction by normal stratification as with reverse stratification. Furthermore, lean burn with reverse stratification is more flexible since the window for "best" injection timing (BIT) normal stratification is fairly narrow relative to that of "worst" injection timing (WIT) reverse stratification (the case of interest), which provides greater flexibility in injection timing.

In this regard, with reference to FIGS. 6 and 7, more optimal operation may be obtained by using two oxygen sensors, a lambda (stoichiometric) sensor 36 as shown after pre-catalyst 35, and a true oxygen or lean sensor located preferably before the compact catalyst. In this way, closed loop operation is achieved throughout most of the speed density (or other comparable) map.

For cold start idle and WOT, just-lean-of-stoichiometric accurate AFR is used and achieved by use of the lambda sensor. For other conditions, i.e. higher speed and load conditions, e.g. MAP between 0.20 and 0.8 and speed between 1200 RPM and 4800 RPM, the lean sensor controls.

If it is advantageous to use simple type of electronic controls rather than computer type mapping, e.g. for retrofit applications, the two sensors can be used advantageously wherein the lean sensor is responsive to a properly weighted triangular AFR distribution (where the product of MAP and speed, approximately equal to power, is the independent variable) which is made proportional to a voltage which is compared to the lean sensor voltage. The peak of the AFR would preferably be around 0.6 MAP and 3000 RPM.

Returning to the principle of reverse stratification, it is advantageous from the perspective of promoting air-fuel mixing and reducing HC emissions to use the preferred form of reverse stratification in which fuel is injected after the intake valve opening into the flowing air to improve mixing and create essentially a narrow air cushion on the piston and piston ring grooves. It may be further advantageous to retard the exhaust valve closing (and intake valve opening) to correspond to the later fuel injection timing, say 30 to 45 degrees ATDC, to introduce greater residual adjacent to the piston and ring crevices to minimize HC emissions. Such an approach is shown with reference to FIGS. 8 to 8c.

FIG. 8 depicts a partially schematic 1½ to 2 times scale drawing of an engine cylinder with a preferred form of VHE ignition and the preferred form of reverse stratification with an air (lean mixture) cushion adjacent to the piston, designated as "inverse mixture stratification" or "IMS". Like numerals depict like parts with respect to FIGS. 1 and 7.

Preferred spark plug 18 with toroidal spark gap 17 is shown except that in this case a variant of spark plug tip 20c is shown which is a conical electrode of approximately 120 degrees included angle which provides a more intense electric field 24a between corner 20b of electrode 20c and corner 26a of shell end 26, i.e. the two corners essentially point towards each other. Also shown are flame fronts 25 emanating from a spark pulse 24, it being understood that these flame fronts represent one segment of angular ignition kernel shell phi produced by circularly moving multiple spark pulses.

In the preferred embodiment of "inverse mixture stratification", one has the layered sections shown in circled numbers (1) through (5), where layers (1) and (2) are the leanest (except possibly for piston layer (5)) and are located in the vicinity of the spark plug gap. As is seen, the flame fronts which emanate in the order a and a', b and b', c and c', d and d', and so on move essentially first in the leaner layers (1) and (2). As the ignition controlled event nears completion flame fronts enter richest layer (3) where vigorous combustion occurs, which then spreads into the last near-the-piston somewhat leaner and thinner layers (4) and (5) which are easily combusted. In this schematic, which represents conditions near TDC, the compression effect of the moving flame has been ignored which would distort the layers shown and push them outwards.

The table of FIG. 8a shows a possible division of the five layers into mixture volume segments Vi with air-fuel ratios AFRi. Approximate total fuel Fueli in each segment is shown, the main fuel being in the first three segments.

FIG. 8b is a schematic of preferred valve, ignition, and fuel injection timing and durations to achieve the type of inverse mixture stratification shown in FIG. 8. This represents a timing condition at light load, moderate speed as in highway driving conditions, e.g. 0.3 MAP and 2400 RPM. The table of FIG. 8c shows typical values for ignition timing, fuel injection timing, and fuel entry into the cylinder (assuming the typical ¼ to 1 msec delay between injection timing and beginning of the fuel spray, and the small delay due to the short travel of the fuel mixture in the intake runner). The fuel enters well after the intake opening and after the exhaust closure (even for the preferred somewhat later exhaust closure). In this preferred embodiment is also shown the later exhaust valve opening (40 degrees BBDC) and earlier intake valve closure (50 degrees ABDC) for higher low-end torque. The fuel injection timing is shown to be taken from the end of the ignition gate, which is assumed at 20% (36 degrees crank angle for the assumed four cylinder engine).

With regard to compression ratio of the engine, there is some choice here which depends on several factors, including levels of NOx and engine efficiency. For the purposes of this invention, a 9 to 1 compression ratio is preferred for maintaining low NOx and allowing for a larger spark gap. Some of the gain in efficiency achieved by, say, 10 to 1 compression ratio, can be obtained by a somewhat retarded exhaust valve opening (as already disclosed) to provide a higher expansion ratio. However, it should be noted that for the case of natural gas engines which require somewhat higher exhaust gas temperatures to help promote oxidation of the difficult to oxidize methane gas, a lower compression ratio, e.g. 9 to 1, with normal exhaust valve opening may be of advantage. Furthermore, the use of reverse stratification, by its very nature, is advantageous in this respect since for a given NOx level it leads to an average not as lean mixture than would otherwise be required, allowing for better oxidation of the hydrocarbon emissions.

Regarding the issue of drivability associated with lean burn operation there are several strategies which can be employed. The main issue is acceleration from light to moderate loads, where torque and power are low, and where air-fuel ratio may be leaned out from moderate to high AFRs as per the discussion with reference to FIG. 6. Under this condition, upon depressing the throttle, the MAP is increased but the power is not increased proportionally (unless fuel is added beyond that dictated by the MAP value). Moreover, with conventional ignition timing, timing will be kept constant (in the range of 0.3 to 0.75 MAP) while the mixture is made leaner, thus aggravating the problem.

To handle this problem, variable, preferably electronic, timing is required with modification of the AFR map. There are several ways to accomplish this, a particularly simple and elegant way which will be disclosed with reference to FIGS. 9 through 12.

One way to reduce the problem of drivability is to have either an acceleration sensor (which may detect flywheel velocity changes) or a means to measure rapid changes in (increased) manifold pressure and respond to them by means of adding fuel in a controlled way. Typically, in the range where the engine is run lean, e.g. above 1200 RPM and between approximately 0.25 and 0.75 MAP value, such controlled fuel enrichment will depend on the MAP value. However, a control system that adds a small percent of fuel during acceleration (flywheel or MAP) may not satisfy the requirements of maintaining low NOx.

Figure 10:
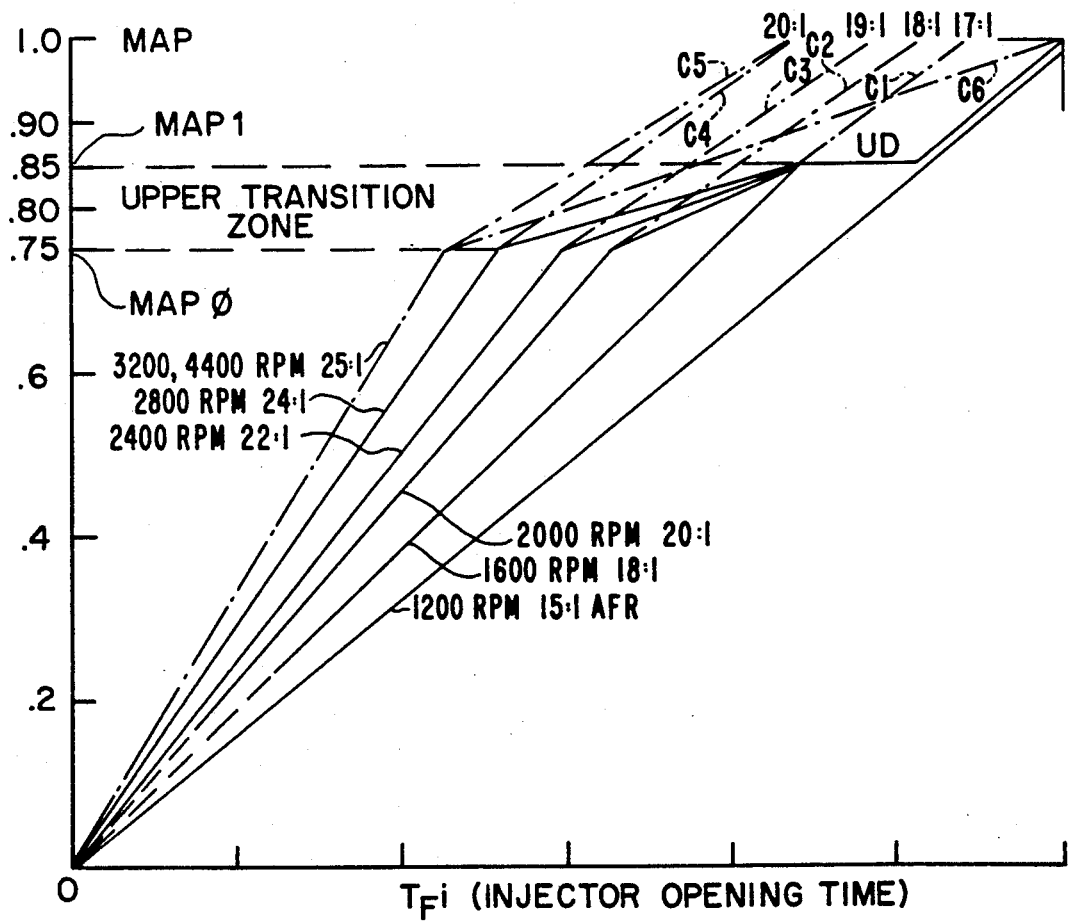
FIG. 10 depicts a map of MAP versus fuel injection timing in which the preferred proportional relationship between AFR and engine speed is employed, and wherein contours of constant engine speed/AFR are shown for a preferred engine operating strategy.
Figure 11:
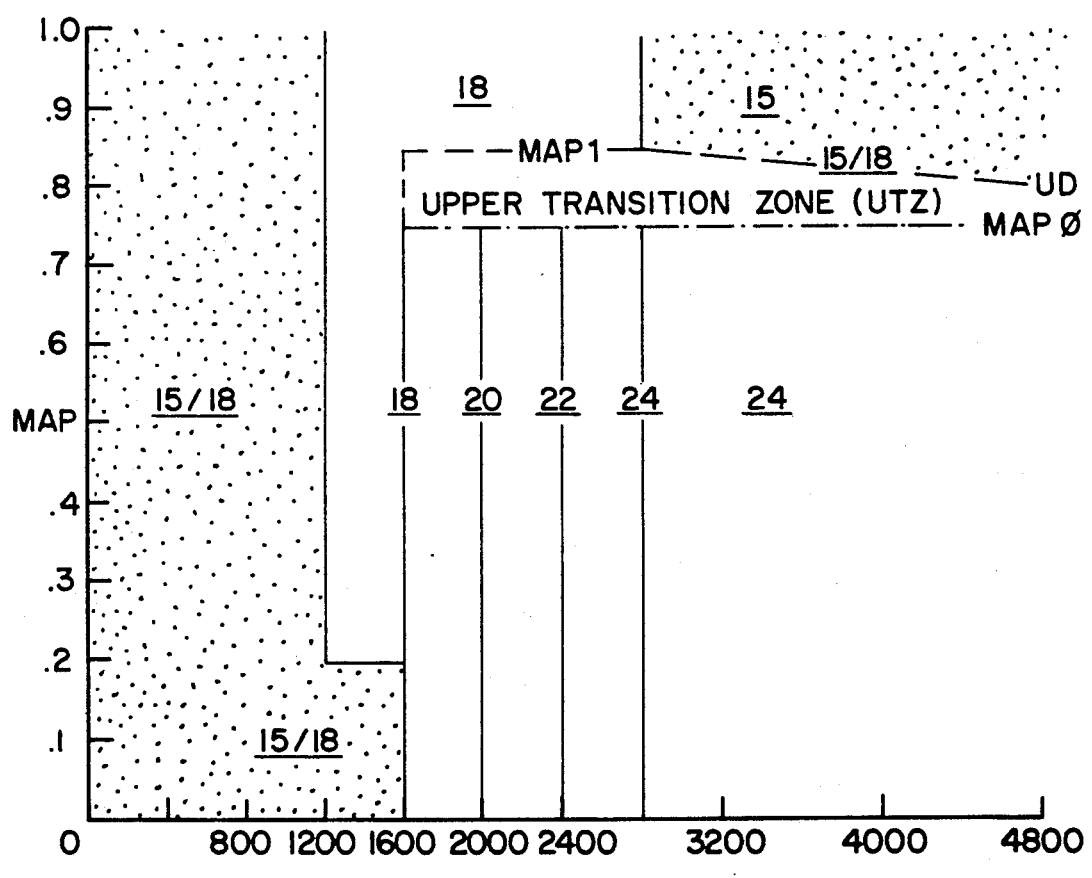
FIG. 11 is a speed-density map corresponding to the preferred AFR/speed strategy of FIG. 10, showing semi-idealized vertical (constant speed) contours of AFR, and the AFR transition zones, including the upper discontinuous AFR transition in which AFR is changed discontinuously at high MAP values from approximately 18:1 AFR to (closed loop) stoichiometry.

Adding fuel during acceleration will decrease AFR and hence increase NOx, which is undesirable. An alternative is to employ a strategy of "discontinuous" AFR enrichment from very lean to (closed-loop) stoichiometry, or just lean of stoichiometry (15:1 AFR), at some selected value of MAP. At 15:1 AFR, NOx level will be comparable to the NOx level at 18:1 to 19:1 AFR, and assuming a catalyst is employed, even without rhodium, NOx would be further reduced (at the 15:1 AFR) to values comparable to those under the very lean 23:1 AFR condition. Such a strategy is shown in FIGS. 10 and 11 with reference to the "upper discontinuous", "UD", MAP boundary, where it is used in a very limited way, i.e. over a very limited MAP range.

The preferred method of handling the NOx/drivability issue, as already stated, is disclosed with reference to FIGS. 9 through 12. This method is based on recognizing certain relationships enumerated below:

1. Ignition timing, i.e. MBT or EBT (a timing curve retarded of MBT) is proportional to AFR for AFR above between 16:1 to 18:1 AFR (defined as AFR0).

2. In general, engines are able to operate at leaner AFRs as the engine speed increases, especially with VHE ignition.

3. If AFR is made to be constant for a given engine speed, versus leaner with MAP value (for MAP less than 0.7) as per FIG. 6, then as the throttle is depressed, power is increased proportionally to MAP value.

Figure 9:
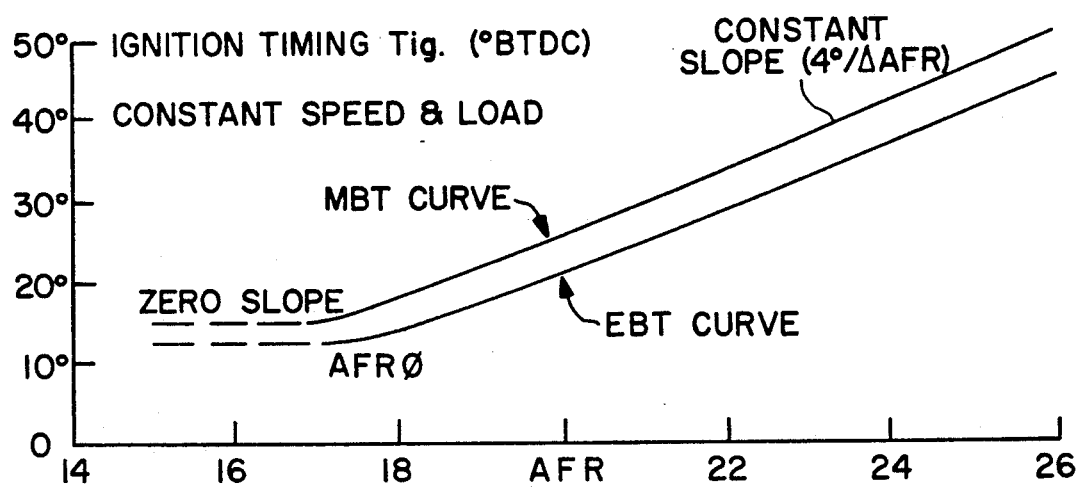
FIG. 9 depicts an approximate relationship between air-fuel ratio and ignition timing.

Ignition timing versus AFR is shown in FIG. 9, which represents actual engine data for a fixed speed and load, showing an approximately zero slope for AFR below AFR0 and constant slope above AFR0 of MBT (and EBT) versus AFR. In this example, the slope is 4 degrees per one AFR.

It follows that if we are to set the AFR contours to be parallel to the speed contours as in FIGS. 10 and 11, then we achieve a situation where the ignition timing is proportional to speed (due to the AFR effect). The total timing is then simply a function of engine speed over a wide range of MAP and RPM values, as it is in standard non-lean burn engines, i.e. ignition timing advance is approximately proportional to engine speed over a speed range. This relationship is given below mathematically in terms of EBT, it being understood that EBT is a point a few degrees retarded of MBT:

$$EBT = EBT0$$
$$\text{for } AFR < AFR0, N < N0$$
$$EBT = EBT0 + KF*(AFR - AFR0) + KN*(N - N0)$$
$$\text{for } AFR > AFR0, N > N0$$

where "*" represents multiplication, N represents engine RPM divided by 400, i.e. N=RPM/400, N0 represents the lower limit engine speed for timing advance, which is between 1200/400 and 1600/400 (N0 between 3 and 4), and KF and KN are constants which, to the simplest approximation, are independent of AFR, RPM, and MAP over a wide range of MAP values (up to just below WOT).

Setting the AFR contours parallel to the speed contours is expressed mathematically as:

$$(AFR - AF0) = KFN*(N - N0),$$

and substituting in the above relationship we obtain:

$$EBT = EBT0 + [KFN*KF + KN]*[N - N0]$$
$$= EBT0 + K*[N - N0]$$

which is a particularly simple relationship for emissions best timing EBT, which depends approximately linearly on engine speed for MAP values below the MAP value where enrichment begins, designated as MAP0 (typically around 0.8).

It should be noted that it is a simple matter to divide the speed domain into more speed segments (N0 to N1, N1 to N2, etc) wherein K is constant within each segment. Alternatively, a curve K(N) which changes slowly with respect to speed can be defined (through testing of the engine) and set electronically via a simple electronic control circuit. By adjustment of the AFR changes with RPM, while still maintaining the constancy of the AFR/RPM contours, the shape of the K(N) curve will change, which can be used to advantage in setting K.

By way of example, if the AFR/RPM relationships of FIG. 10 are used, i.e. KFN=2, and if we assume:

$$KF = 3 \text{ degrees/one } AFR; KN = 3 \text{ degrees/400 } RPM,$$
then
$$K = KFN*KF + KN = 2*3 + 3 = 9 \text{ degrees/400 } RPM,$$

over the speed range of 1600 RPM to 2800 RPM, designated as N0 and N1.

FIG. 10 shows a graph of MAP versus fuel flow (fuel injection timing) which implements the ideas presented above. The injection timing Tfi assumes the injector opening time (dead time) of typically ⅛ millisecond subtracted out so the AFR/RPM contours pass through the origin. The (just lean of) stoichiometry line is the reference line having an AFR value of 15:1 and a speed below 1200 RPM in this case. The AFR contours selected in this example are the four AFR contours 18:1, 20:1, 22:1, and 24:1 (plus two higher speed contours) with their corresponding constant RPM values of 1600, 2000, 2400, and 2800 RPM. Also shown is the upper transition zone at a high MAP value of 0.75 (MAP0) where the AFR contours change rapidly and continuously to a MAP value of 0.85 (MAP1) from their constant AFR value to a target AFR value (of 18:1, AFR0, shown here), and then change discontinuously, i.e. abruptly, along the UD line (at the MAP value MAP1) to an AFR just lean of stoichiometry for close to maximum power.

With regard to the upper transition zone, an alternative enrichment option is shown by means of the broken dashed-dotted contours designated as C1 through C6. In this option, the AFR contours enrichen to intermediate AFRs, e.g. 17:1, 18:1, 19:1, and 20:1 via the contours C1, C2, C3, and C4 for the four contours 18:1, 20:1, 22:1, and 24:1 respectively, versus to 15:1 along the UD line. For speeds above 2800 RPM is shown the preferred embodiment of 25:1 AFR with two sub-cases, for speeds between 3200 RPM and 4000 RPM wherein enrichment is to 20:1 AFR along contour C5, and for speeds above 4400 RPM wherein enrichment is to 15:1 along contour C6 (for high speed power). Such a strategy is especially applicable in engines with high low-end torque, i.e. two stroke engines, large displacement performance four stroke engines, engines with early intake valve closure, etc.

Figure 10A:
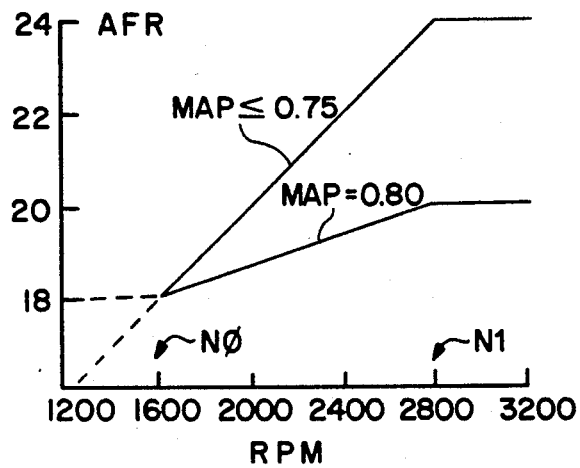
FIG. 10a shows the actual AFR versus RPM linear relationships corresponding to this preferred strategy.

FIG. 10a, an insert to FIG. 10, depicts the constant increase of AFR with engine speed over the design speed range of N0 to N1 (1600 to 2800 RPM). Two values of MAP are shown, values below MAP0, and between MAP0 and MAP1.

FIG. 11, which can be referenced to FIG. 6, represents a speed-density map incorporating the solid line (UD strategy) contours of FIG. 10. As in FIG. 6, circled numerals represent AFR regions. The main features shown here are the vertical AFR contours representing constant speed contours, and the rapid change in AFR at the upper boundary MAP (with value of around 0.85 in this example) designated by the line labeled UD. As with FIG. 6, either just lean of stoichiometry (15:1) or lean (18:1) AFR can be employed for idle (MAP below 0.2, RPM below 1200). Note that the lean AFR regions (AFRs of (18), (20), (22), and (24) shown here by way of illustration) connect to the UD line via the upper transition zone, as also depicted in FIG. 10.

Figure 12:
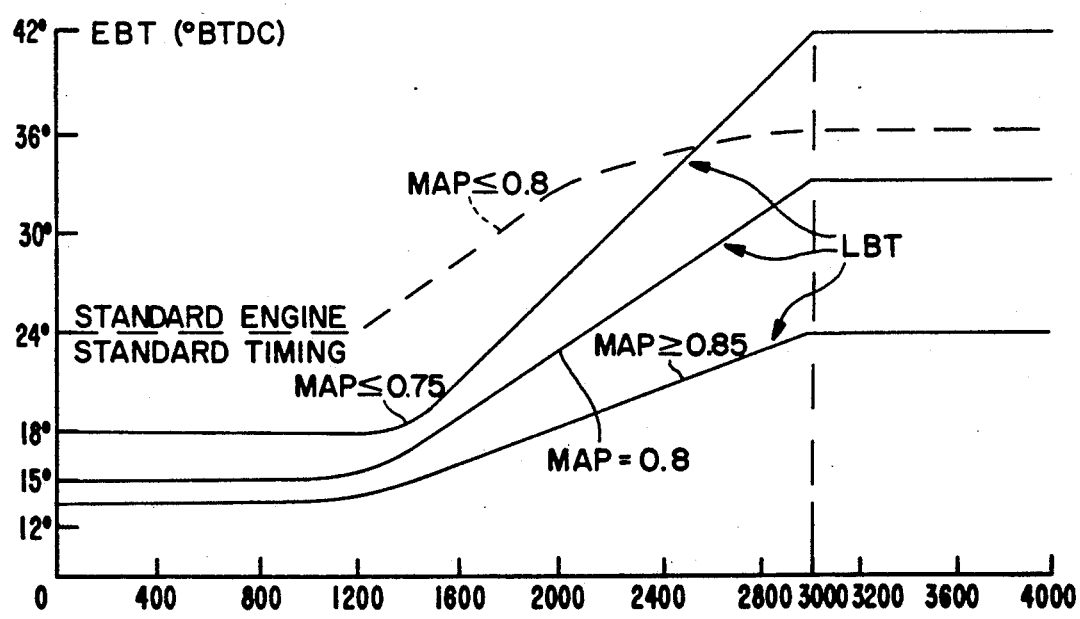
FIG. 12 is a graph comparing a typical standard ignition timing versus the proposed more optimal lean burn timing (LBT) proposed herein.

Finally, FIG. 12 depicts EBT contours for three MAP values and/or ranges following the preferred approach described above, designated as "lean burn timing" or "LBT". For comparison, a typical standard non-lean burn engine timing contour is shown. A key feature of the LBT contours is their simplicity given the greater complexity of the lean burn engine and the ability to maintain the correct timing relationship, so important for minimizing NOx. A lean sensor, i.e. wide range oxygen sensor, can be used to provide reference points for the LBT contours.

With regard to the "upper discontinuous lean-stoichiometric" (UDLS) strategy which may be used in conjunction with the LBT strategy, it should be noted that the UD boundary may be variable, and depend on vehicle power requirements, coming into play under acceleration and WOT conditions. In effect, in accelerating from one vehicle speed to another, if the speed change can be made while maintaining the very lean AFR, then nothing further needs to be done (and NOx is minimized). On the other hand, if the speed change cannot be made successfully (based on some drivability factor), then variable UDLS is invoked and the engine will move from very lean AFR to stoichiometric AFR and back to very lean AFR. Such discontinuous change in AFR, and assurance of stoichiometric operation above the upper discontinuity MAP value, can be achieved by using multi-point fuel injection systems with lambda sensor for closed-loop operation. Preferably, two maps are used, a lean AFR map and a stoichiometric map. In this way, the AFR can move, for practical purposes, almost instantly from very lean to stoichiometry to thus minimize NOx.

For optimization, discontinuous change in emissions best timing (EBT) is also employed, from near MBT at very lean AFR to retarded timing at stoichiometry, achieved by electronic control of the timing in precise synchronization with the discontinuous change in AFR. The transition can be smoothed in terms of drivability by varying the timing so that in moving from very lean to stoichiometric AFR, timing is MBT just prior to leaving the lean condition (map), and is set very retarded upon arrival at the stoichiometry condition (map), whereupon it is rapidly advanced to its normal, somewhat retarded of MBT timing.

With respect to improving low-end torque while maintaining low NOx, another preferred embodiment is to employ greater reverse charge stratification at higher MAP values and relatively lower AFR for higher low-end torque (at the lower engine speeds). In this way, lean operation can be maintained at a higher level of acceleration, e.g. average AFR of 18 to 1 and 23/15 reverse stratification.

It should be noted that, with reference to most of these discussions, the MAP measure can be replaced by a mass air-flow measure or other means for calibrating AFR.

Also, note that EBT, emissions best timing in degrees BTDC, can be taken as MBT minus a few degrees as already mentioned, or it can be prescribed relative to MBT by a simple formula such as:

$$EBT = MBT(RPM, MAP, AFR) * (AFR/AFRLL)$$

where AFRLL is the lean operating limit AFR, e.g. 25:1 (just lean of 24:1 as per FIGS. 10 and 11). This represents a timing retarding factor which skews the ignition timing towards the retarded end, lowering NOx with minimal effect on efficiency. Near and at AFRLL, the timing is close to MBT for stable lean limit operation (with minimal effect on NOx at this very lean AFR) and good torque. Note that since MBT drops with falling AFR, the actual timing retard will only be 5 to 10 degrees retarded of MBT over the AFR range of operation.

For the purposes of this invention "normal operation of an IC engine" is one where the throttle is essentially constant with a MAP between 0.2 and 0.75 atmospheres and a speed in the range of 1500 RPM and 4500 RPM.

Figure 13:
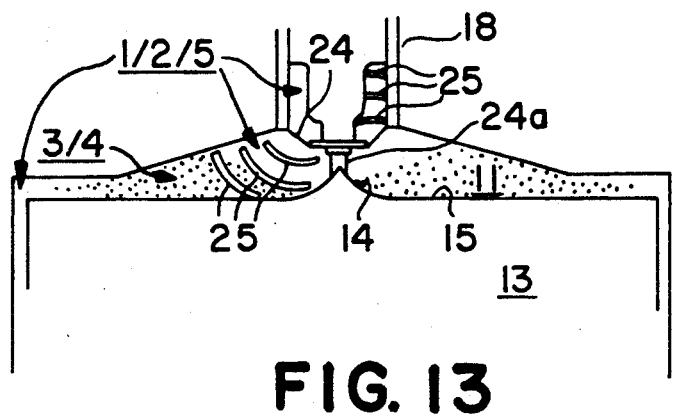
FIGS. 13 and 13a are side view schematics of a preferred embodiment of the "upper-half clam shell" combustion chamber with integrated spark plug emphasizing the nature of the combustion chamber.
Figure 13A:
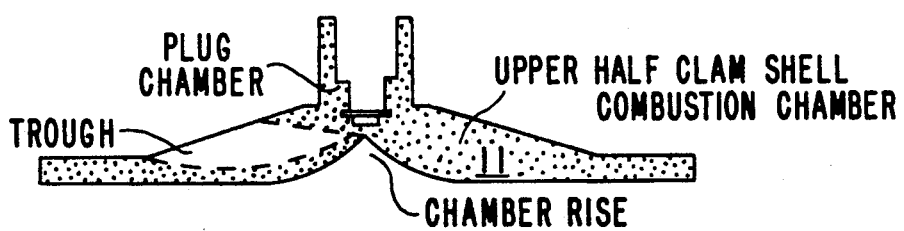

Finally, in FIGS. 13 and 13a are summarized the preferred upper-half clam shell combustion chambers with integrated VHE ignition spark plug, with like numerals representing like parts with respect to FIGS. 1, 7, 8. FIG. 13 depicts the reverse stratification regions as per FIG. 8, designating the very lean regions as (1/2/5) and the moderately lean regions as (3/4), and showing a simple piston surface which is essentially flat (regions 15) and peaked at the center region 14, designated as "chamber rise". The profile of the upper-half clam shell combustion chamber of FIG. 13 defined by the piston near TDC is depicted as a shadow drawing of FIG. 13a, which further defines the cross-hatched trough where the mixture is stratified richer.

Figure 14:
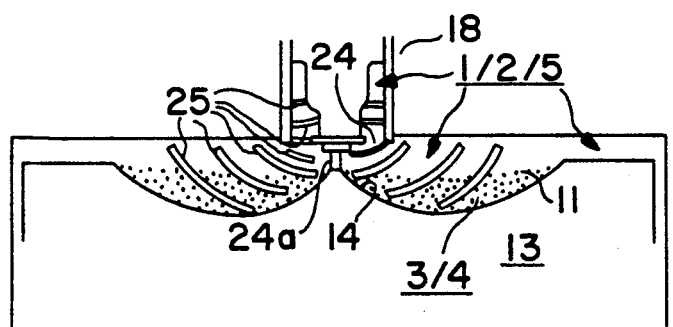
Figure 14A:
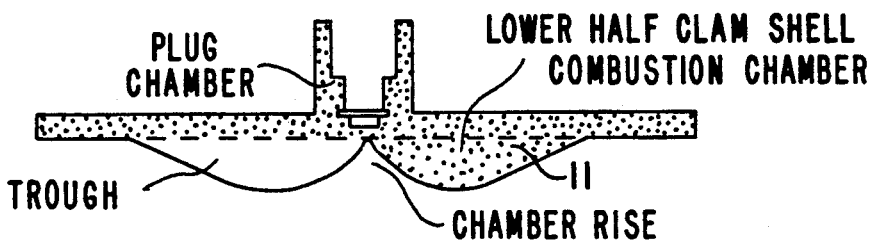

FIGS. 14 and 14a depict the reverse of FIGS. 13 and 13a, with like numerals representing like parts with respect to FIGS. 13, 13a. The combustion chamber shown is defined as the "lower-half clam shell" combustion chamber, and can be viewed as essentially a mirror image of the trough section about a horizontal plane, the trough now being at the bottom of the chamber defined entirely by the piston (versus by the cylinder head in the "upper-half clam shell" design). This design also has the central piston chamber rise for firing to the piston, if required. In this design, it is easier to maintain reverse stratification since the fuel will more naturally tend to collect at the bottom of the chamber in the trough, because of gravity and piston motion. On the other hand, during cold-start, the squish flow will not be as effective as in the upper-half clam shell design in helping to vaporize the fuel that collects on the piston.

Finally, with reference to LBT, it should be recognized that it is a relatively simple matter to incorporate in the VHE ignition control system an additional gate generator of varying percent duration over the speed range where the AFR changes, e.g. 1200 RPM to 3000 RPM, to produce the required timing advance with RPM, where RPM is preferably related to AFR as disclosed. In this way, one can retrofit the system with the speed advance reflecting the leaning out of the engine that occurs as part of the retrofit modification. That is, the engine is retrofitted with the VHE ignition, the fuel system is adjusted to lean out with engine speed, and the gate is adjusted to provide the approximately linear advance with speed. For a carbureted engine, the main adjustments would be to lean out the choke and the idle circuits (to take advantage of the more powerful VHE ignition) and to reduce the size of the main metering jet(s). Since the main jet(s) meter and control relatively (to the idle circuit) more and more of the fuel with engine speed, it follows that the desired gradual leaning with speed (up to a maximum speed) is achieved by reducing the size of the main metering jet (or increasing the size of the metering rod). More ideally, the metering rod could be re-contoured to provide the desired leaning out with speed.

Alternatively, in terms of either an OEM or retrofit package, one can use an oxygen (lean) sensor and take its output (typically a voltage proportional to AFR) with a voltage output proportional to speed, and advance the timing in response (in some proportional way) to these output voltages. Also, by using an electronically controlled fuel metering system, either a stand-alone system such as a central fuel injector (CFI) or a supplementary system added on to an overly leaned out carburetor, one can in effect "lock" the AFR to the speed to achieve the desired speed-AFR contours and advance the timing in relationship to the locked output voltages, e.g. to some weighted average of the voltages.

For the case where an end-of-gate fuel injection is employed, as disclosed, it may be advantageous to have an extended gate at low coolant temperatures, i.e. approximately 50% gate for a four cylinder engine below 60 degrees F., and have the gate reduce to its nominal 20% to 25% at operating temperature of 180 degrees F. In this way, when the engine is cold, the fuel is injected later in the intake valve opening event where air-flow is greater and fuel vaporization is enhanced. This will improve cold running operation without requiring as much additional fuel. Note that for an eight cylinder engine the 50% gate would translate to a 100% gate which could be attained either by limiting the gate to, say 90%, or by firing the injector on the subsequent ignition event.

In summary, the present invention describes apparatus, including VHE ignition and special combustion chamber shapes, and methods of operating an engine as a lean burn engine for achieving the expected advantages of high engine efficiency, very low CO, and low HC (which can be brought to very low levels with an oxidation catalyst), and for maintaining low NOx, which can be further reduced by: a) using specialized VHE ignition (integrated with the engine) to produce a very large flame kernel, b) increasing the level of engine residual in a controlled way, c) producing microscale turbulence at the spark plug site, and d) producing reverse stratification, and preferably inverse mixture stratification, or locating the spark plug at the leaner region of the combustion chamber, and e) employing a timing strategy based on increasing air-fuel ratio in relationship to engine speed to produce particularly simple timing curves. Preferably, at the OEM (new car design) level all of a) to e) are employed, with the combustion chamber designed to more effectively incorporate the principles disclosed herein and the VHE ignition plug integrated into the combustion chamber.

Finally, it is particularly emphasized with regard to the present invention, that since certain changes may be made in the above apparatus and method without departing from the scope of the invention herein disclosed, it is intended that all matter contained in the above description, or shown in the accompanying drawings, shall be interpreted in an illustrative and not in a limiting sense.

What is claimed is:

1. In an internal combustion, IC, engine including means for forming at least one combustion chamber, means for forming an air-fuel mixture therein, means for cyclically igniting said mixture, the latter means including at least one igniter element in contact with the chamber's air-fuel mixture contents, and means for cyclically energizing said igniter element, the improvement comprising:

means for forming a local air-fuel mixture adjacent said igniting element that is lean of fuel relative to the average air-fuel mixture ratio is said chamber to produce a reverse stratified lean-to-rich stratification with reference to said igniting element in at least one operating condition of the engine.

2. The internal combustion engine of claim 1 wherein said local fuel mixture forming means comprise:

means defining an essentially upper-half-clam-shell region within said chamber formed cyclically as the piston moves toward the chamber wall in a compression stroke essentially at the time of spark ignition of said igniter element, the igniter element being located within said region, said region being characterized by air-fuel mixture in said combustion chamber being squeezed inward and upwards towards a central portion within said clam-shell region wherein is located the spark firing end of said igniter element.

3. The engine of claim 2 wherein an essentially convex portion of a surface region of said piston and an essentially concave portion of a region of a wall of said chamber, said piston and chamber wall regions being in essentially confronting relation during the compression stroke, form said means defining an essentially upper-half-claim-shell combustion chamber region, whereby the air-fuel mixture in the combustion chamber is squeezed inward and towards a central region within the chamber wall.

4. The engine of claim 3 wherein said chamber comprises a cylinder with a head portion containing said igniter element and said concave chamber wall region is within said portion, said piston comprising a reciprocating member movable within said cylinder toward the head portion and igniter element during the compression stroke.

5. The engine as defined in claim 4 wherein said upper-half-clam-shell combustion chamber defined at TDC has a height at the rim of the chamber which is at least one half the maximum height which occurs near the center of the chamber near the shell edge of an essentially centrally located spark plug, said chamber shape producing radial squish near TDC.

6. The internal combustion engine of claim 1 with a cranking piston drive system and cyclic ignition with means to adjust ignition timing in response to manifold pressure and cyclic speed of the engine as a whole and further comprising:

means for controlling said air-fuel mixture and timing
(i) by holding the overall air-fuel ratio and timing in a first preselected range of engine speed and manifold pressure in essentially linear relations to speed, and
(ii) by holding the overall air-fuel ratio and timing essentially constant outside the preselected range.

7. An engine as defined in claim 6 wherein the said first preselected range comprises approximately 1200 to 3000 RPM.

8. An engine as defined in claim 7, wherein said selected manifold absolute pressure range, over which said ignition timing is approximately linearly depended on engine speed, is approximately between 0.2 and 0.75 atmospheres.

9. An engine as defined in claim 8 wherein said variation in air-fuel ratio, AFR, is from approximately 18:1 to 24:1 over said speed range such that said ignition timing advances approximately linearly with engine speed due to the speed related AFR variation.

10. The engine as defined in claim 9 wherein said range of timing advance is approximately 20 degrees crank angle.

11. The engine as defined in claim 9 wherein said AFR range above said upper MAP value of approximately 0.75 atmospheres changes such that AFR enrichment occurs to a new AFR range of between approximately 15:1 and 20:1 at maximum MAP value of approximately one atmosphere.

12. An internal combustion, IC, engine as defined in any of claims 1, 4 or 7, including spark ignition means of very high power high energy, which is integrated in a combustion chamber of said engine and wherein said ignition is of the voltage doubling type, with coil turns ratio N of approximately 60 for an input voltage of approximately 350 volts, with spark currents in the range of one amp to ten amps.

13. The system as defined in claim 12 wherein said ignition produces gate-operated multiple spark pulses per ignition firing to ignite a large volume of mixture.

14. The system as defined in claim 13 wherein spark plugs of said ignition have an essentially toroidal spark gap of gap size between 0.06" and 0.25".

15. The system as defined in claim 14 wherein tip of center electrode of spark plug and piston are shaped and oriented to produce a piston-spark-gap at top-dead-center, TDC, which is less than the fixed toroidal gap.

16. The system as defined in claim 14 wherein high voltage center electrode employs a thin edge of thickness about 1/32" oriented relative to the corner of the spark plug shell edge such that the high voltage breakdown fields point from the corner edge of said thin edge to the corner of the shell edge to reduce the breakdown field.

17. The engine as defined in claim 13 wherein reverse stratification is used under highly dilute mixture conditions for NOx control and is achieved by using fuel injectors which are fired synchronous with the end of the gated spark pulsing period for normal operating conditions of said IC engine, other than cranking and wide-open-throttle, WOT, and other conditions where more normal rich-to-lean, stratification is of advantage.

18. The engine as defined in claim 17 wherein said engine is a four cylinder engine with ignition firing order 1,3,4,2 and wherein cylinder #4 fuel injector is fired synchronous with the end of ignition gate of cylinder #1, the remaining injectors being fired in the firing order 2,1,3.

19. The system as defined in claim 18 wherein the ignition gate under normal operating engine conditions, cruise conditions, is approximately 45 crank angle degrees, 25% of the time between firing for a four cylinder engine.

20. The engine as defined in claim 19 wherein the gate during at least one of starting and during running at low coolant temperatures is approximately 40%, to produce more homogeneous and less reverse stratification for easy starting and improved cold running.

21. An internal combustion engine as defined in claim 12 wherein discontinuous AFR transition between very lean and stoichiometric operation is employed to provide high level of acceleration not possible by maintaining lean AFR.

22. An IC engine as defined in claim 21 wherein emissions best timing, is employed both to minimize NOx emissions during normal operation of said IC engine and to reduce the change in power during the upper discontinuous lean/stoichiometric, AFR transition used for hard accelerations, wherein for said AFR transition, at the time of transition, timing is near MBT at the lean side of the boundary and timing is substantially retarded from MBT at the stoichiometric side of the boundary, said retarded timing being rapidly advanced once the transition is made to just retarded of MBT, approximately 5 degrees retarded of MBT.

23. An engine as defined in claim 12 constructed and arranged to have a higher than normal residual at low and intermediate MAP values, of about 15% residual, and a lower than normal of about 5% residual, at MAP values above approximately 0.75, the engine being operated under lean AFR conditions of greater than 18 to 1 AFR for at least one engine operating condition.

24. The engine as defined in claim 23 constructed and arranged so that the exhaust valve closes at approximately 25 degrees after TDC, ATDC, to increase the residual and wherein the exhaust valve opens at approximately 30 degrees before bottom-dead-center, BBDC, and the intake valve closes at approximately 50 degrees after bottom-dead-center, ABDC for higher low-end torque.

25. The engine of claim 23 wherein variable valve timing is employed to achieve the said variable residual in response to manifold absolute pressure, MAP.

26. The engine of claim 25 wherein said variable valve timing produces later exhaust valve closure at low to moderate MAP, MAP below approximately 0.75, and earlier exhaust valve closure at higher MAP values, MAP above approximately 0.75, to provide higher low-end torque so as to be able to maintain very lean, over 18 to one, air-fuel ratio for most accelerations over a typical drive cycle.

27. The engine as defined in claim 1 wherein under normal engine operating conditions excluding starting and WOT the fuel is injected to enter the cylinder after the intake valve opening and fuel injection is terminated before the closing of the intake valve to produce inverse mixture stratification.

28. An internal combustion engine as defined in claim 1 wherein sufficient reverse stratification is employed such that under normal engine operating conditions the average air-fuel ratio, AFR, is between approximately 18:1 and 23:1 to one to simultaneously provide low NOx levels and sufficient high low-end torque below the MAP value where power enrichment is employed, under around 0.8 MAP, to ensure that under most typical drive cycle accelerations as defined by the majority of the emissions drive cycles, lean AFR is maintained for the majority of the accelerations encountered.

29. In an internal combustion engine including means for forming at least one combustion chamber, means for forming an air-fuel mixture therein, means for cyclically igniting said mixture, the latter means including at least one igniter element in contact with the chamber's air-fuel mixture contents, and means for cyclically energizing said igniter element, the improvement comprising:
    means defining an essentially upper-half-clam-shell region within said chamber formed cyclically as the piston moves toward the chamber wall in a compression stroke essentially at the time of spark ignition of said igniter element, the igniter element being located within said region, said region being characterized by air-fuel mixture in said combustion chamber being squeezed inward and upwards towards a central portion within said clam-shell region wherein is located the spark firing end of said igniter element, such that under at least one operating condition of the engine the mixture is lean-to-rich, or reverse, stratified with respect to said igniter element.

30. An internal combustion engine comprising, in combination,
 (a) means defining at least one combustion chamber,
 (b) means defining a cranking piston drive system with a piston element movable within said chamber and related to said chamber for effecting cyclic compression/expansion cycles of relative movement, including movement of a piston element surface toward the chamber wall to compress gas contents of the chamber and power expansion of said chamber driving the piston element and the piston drive system as a whole,
 (c) means for admitting an air-fuel mixture to said chamber,
 (d) means for cyclically igniting said mixture with cyclic ignition timing in relation to piston movement to effect said power expansion, and ultimately through the piston drive system, said compression, including means to automatically adjust ignition timing in response to manifold pressure and cyclic speed of the engine as a whole,
 (e) means for controlling said air-fuel mixture and timing
  (i) by holding the overall air-fuel ratio and timing in a first preselected range of engine speed and manifold pressure in essentially linear relations to speed, and
  (ii) by holding the overall air-fuel ratio and timing essentially constant outside the preselected range.

* * * * *